United States Patent
Miner et al.

(10) Patent No.: US 12,189,763 B2
(45) Date of Patent: Jan. 7, 2025

(54) SECURING DIGITAL DATA BY AUTOMATIC MECHANISM INCAPACITATING DATA STORAGE DEVICE

(71) Applicant: International Business Machines Corporation, Armonk, NY (US)

(72) Inventors: Jeremy Miner, Cary, NC (US); Carolina Garcia Delgado, Zapopan (MX); Jennifer I. Bennett, Rochester, MN (US); William J Green, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 266 days.

(21) Appl. No.: 17/817,669

(22) Filed: Aug. 5, 2022

(65) Prior Publication Data
US 2024/0045951 A1 Feb. 8, 2024

(51) Int. Cl.
*G06F 21/55* (2013.01)

(52) U.S. Cl.
CPC ...... *G06F 21/554* (2013.01); *G06F 2221/031* (2013.01)

(58) Field of Classification Search
CPC ........ G06F 21/55; G06F 21/554; G06F 21/60; G06F 21/70; G06F 21/86; G06F 2221/031
See application file for complete search history.

(56) References Cited

U.S. PATENT DOCUMENTS

| | | | |
|---|---|---|---|
| 9,015,075 B2 * | 4/2015 | Hughes | G06F 21/78 700/286 |
| 9,769,213 B1 | 9/2017 | Madisetti | |
| 9,781,603 B1 * | 10/2017 | Nenov | G08B 13/08 |
| 9,928,386 B1 | 3/2018 | Gardner | |
| 10,860,696 B2 * | 12/2020 | Hughes | G06F 21/86 |

(Continued)

FOREIGN PATENT DOCUMENTS

| | | |
|---|---|---|
| CN | 104078074 A | 10/2014 |
| CN | 105426784 A | 3/2016 |

(Continued)

OTHER PUBLICATIONS

International Search Report and Written Opinion for International Application No. PCT/CN2023/099020, International Filing Date: Jun. 8, 2023, Mailing Date: Sep. 14, 2023, 7 pages.

(Continued)

*Primary Examiner* — Hosuk Song
(74) *Attorney, Agent, or Firm* — Michael A. Petrocelli (57) ABSTRACT

Techniques are presented for physically incapacitating data storage functionality of a computer data storage device for preventing access of data stored on the device. A security breach can be detected of a device housing a component communicable with a computer and where digital data is storable on the component. A mechanism can be activated for physically disabling the component in the device, in response to the detecting of the security breach. The incapacitating of the component can be a result of the mechanism physically contacting the component, in response to the activation of the mechanism, and the incapacitating of the component renders digital data stored on the component unretrievable by a computer.

20 Claims, 7 Drawing Sheets

(56) References Cited

U.S. PATENT DOCUMENTS

| | | | | |
|---|---|---|---|---|
| 11,263,355 | B2* | 3/2022 | Rooyakkers | G06F 21/71 |
| 11,314,540 | B2* | 4/2022 | Nenov | G06F 9/45558 |
| 11,481,521 | B2* | 10/2022 | Soffer | G06F 21/602 |
| 11,545,228 | B2* | 1/2023 | Kim | G11C 17/18 |
| 11,704,445 | B2* | 7/2023 | Rooyakkers | G06F 21/604 |
| | | | | 361/752 |
| 11,735,030 | B2* | 8/2023 | Lamb | G08B 29/12 |
| | | | | 340/506 |
| 11,973,879 | B2* | 4/2024 | Haskell | H04L 9/3247 |
| 2009/0249460 | A1 | 10/2009 | Fitzgerald | |
| 2014/0263216 | A1 | 9/2014 | Clark | |
| 2022/0114252 | A1 | 4/2022 | Syed | |

FOREIGN PATENT DOCUMENTS

| | | | |
|---|---|---|---|
| CN | 114667752 | A | 6/2022 |
| JP | 4568910 | B2 | 10/2010 |
| WO | 2002095550 | A2 | 11/2002 |
| WO | 2013083941 | A1 | 6/2013 |
| WO | 202190202 | A1 | 5/2021 |

OTHER PUBLICATIONS

"Data Protection As A Service Market Size Report, 2020-2027", Grand View Research, Market Analysis Report, Published Date: Oct. 2020, 12 pages, <https://www.grandviewresearch.com/industry-analysis/data-protection-as-a-service-market>.

"Next-Generation Data Storage Market Size Report, 2019-2025", Grand View Research, Market Analysis Report, Published Date: Aug. 2019, 13 pages, <https://www.grandviewresearch.com/industry-analysis/next-generation-data-storage-market#>.

Alder, Steve, "Hard Drive Theft Sees Data of 1 Million Individuals Exposed", HIPAA Journal, Jun. 23, 2017, 2 pages, <https://www.hipaajournal.com/hard-drive-theft-sees-data-1-million-individuals-exposed-8859/>.

Anonymous, "A Key is Attached to HDD in Order to Protect the Data of HDD from the Steal or Lose of Note PC", An IP.com Prior Art Database Technical Disclosure, IP.com No. IPCOM000173295D, IP.com Electronic Publication Date: Jul. 30, 2008, 2 pages.

Anonymous, "A Method to Destroy Magnetic Tape Storage Media", An IP.com Prior Art Database Technical Disclosure, IP.com No. IPCOM000238891D, IP.com Electronic Publication Date: Sep. 24, 2014, 7 pages.

Anonymous, "HDD physics Destruction function (Information Leak Prevention)", An IP.com Prior Art Database Technical Disclosure, IP.com No. IPCOM000189055D, IP.com Electronic Publication Date: Oct. 27, 2009, 2 pages.

Lee, Dami, "A thief stole unencrypted hard drives filled with 29,000 Facebook employees' information", The Verge, Dec. 13, 2019, 2 pages, <https://www.theverge.com/2019/12/13/21020736/facebook-theft-unencrypted-drives-employee-payroll-security>.

Mell, et al., "The NIST Definition of Cloud Computing", National Institute of Standards and Technology, Special Publication 800-145, Sep. 2011, 7 pages.

* cited by examiner

SECURING DIGITAL DATA BY AUTOMATIC MECHANISM INCAPACITATING DATA STORAGE DEVICE

BACKGROUND

The present disclosure relates to protecting digital data on a computer storage device by using a mechanism to physically incapacitating and/or disabling the data storage functionality of the device, in response to unauthorized physical access of the device. For example, an unauthorized physical access of the device can include the integrity of the device being breached.

Collection and usage of data stored on computer readable storage devices has grown exponentially. The global storage market has experienced enormous growth to accommodate the rise in data consumption wherein the data is stored on a digital storage device. In one example, as the number of physical storage devices increases, and there is data stored on the devices, the potential for unauthorized use, access, or appropriation of the devices can increase. Such devices can include data which is considered valuable to one or more entities or people.

In one example, a digital storage device can be vulnerable to unauthorized usage and physical access from an entity, for example, a person. Such physical removal or access can occur during shipment of the device, relocation, or removal of the device from a storage or usage facility. If a device is compromised, unauthorized access to the data can occur. In one example, deleting data may not be enough to secure data, as methods can be used to recover deleted data. In another example, encryption types can also be broken resulting in access to encrypted data, and such technique to break encryption are evolving using techniques such as Quantum computing.

In another example, present warning system of unauthorized device access can be too slow in warning of unauthorized access alerts. For example, physical security at facilities and evidence of tampering on electrical component racks and/or packaging warning of unauthorized usage or intrusion, may not occur in time to stop removal of a device.

SUMMARY

The present disclosure recognizes the shortcomings and problems associated with current techniques for preventing unauthorized access to digital data in a data storage device. The present invention provides a system and method for physically incapacitating data storage functionality of a computer data storage device to prevent a security breach by unauthorized access to the data stored on the data storage device. Such incapacitating can include permanent disablement of the device functionality including disablement of one or more components of the device.

In one example, the present invention can include a technique of physically destroying digital memory, for example, flash memory, and other integrated circuit components of a flash memory-based disk drive. A destruction mechanism triggers when unauthorized removal of a disk drive is detected, or when specifically activated by an end user. In one example, destruction of a memory device involves a series of elements such as smashers being forced down onto non-volatile memory modules of a flash drive under enough force to fracture the modules. The smashers can be made of a hardened material strong enough to break through the packaging of non-volatile memory modules and other integrated circuit (IC) components. The smashers can be formed into a shape that comes to a point, such as a cone or pyramid. Each smasher can be lined up directly above a target component. When activated, the smashers can be lowered onto the components with enough force to break them.

In one embodiment, a pressurized chamber within a physical enclosure of a storage device holds up a hardened plate containing appropriately positioned smashers. The plate can be anchored to the base of the enclosure with a series of coiled springs. The pressure inside the enclosure holds up the plate above a circuit board and places the coiled springs into a state of tension. When the pressure is lowered past a certain threshold, the tension in the springs is released, and the plate is forced downward onto the board, where the smashers penetrate and destroy the components. The material under tension does not have to be a spring, it can be a material with sufficient physical properties to stretch when the enclosure is pressurized, and to exert a downward force when the pressure is released. When the security mechanism is activated, the pressure in the chamber is released via actuating an escape valve. Activation of the destruction sequence occurs when the storage medium has been removed from its host device or when a user manually sends a destruction instruction or signal via software. One advantage of a pressure variant is that the data storage drive becomes tamper proof. Any effort to open the drive enclosure results in the pressure being relieved, and the smasher plate being released to destroy the modules.

In an aspect according to the present invention, a computer-implemented method for physically incapacitating data storage functionality of a computer data storage device for preventing access of data stored on the device including: detecting a security breach of a sealed device defining an inner chamber housing a component communicable with a computer, and digital data being storable on the component; activating a mechanism communicating with the inner chamber for physically disabling the component in the device, in response to the detecting of the security breach; and incapacitating the component as a result of the mechanism physically contacting the component, in response to the activation of the mechanism, the incapacitating of the component renders digital data stored on the component unretrievable by a computer.

In a related aspect, the mechanism is positioned in the sealed device to physically contact and incapacitate the component in response to the activation of the mechanism.

In a related aspect, the mechanism is positioned in the sealed device in a biased state to physically contact the component; and the mechanism is released to an unbiased state to incapacitate the component in response to the activation of the mechanism.

In a related aspect, the component includes a computer readable data storage medium.

In a related aspect, the method further includes: receiving an authorized activation instruction, at a computer, of a protocol sent by a user; and in response to the receiving of the authorized activation instruction, initiating the activating of the mechanism for physically incapacitating the component in the device.

In a related aspect, the incapacitation of the component includes physical disablement of computer readable storage medium included in the component, wherein data stored on the computer readable storage medium is unreadable by a computer.

In a related aspect, the mechanism includes a series of elements and the component includes a series of modules, the series of elements spatially corresponding to the series of elements, respectively, and the series of elements physically incapacitating the corresponding series of modules in the sealed device, in response to the activation of the mechanism.

In a related aspect, the method further including activating a series of mechanisms for physically incapacitating corresponding components in the sealed device, wherein the mechanism is part of the series of mechanisms, and the component is part of the corresponding components.

In a related aspect, the components each include a computer readable data storage medium.

In a related aspect, the detecting of the security breach includes detecting a loss of air pressure in the sealed device.

In a related aspect, the mechanism includes an element for physically contacting the component.

In a related aspect, the element is comprised of a specified hardened material to disable the component.

In a related aspect, the element is formed in a specified shape to enhance disablement of the component.

In a related aspect, the mechanism includes a biased element for disabling the component.

In a related aspect, the mechanism includes a coiled spring for enabling disablement of the component, the coiled spring being biased open such that activation of the mechanism releases potential energy of the coiled spring.

In another aspect according to the present invention, an apparatus for physically incapacitating data storage functionality of a computer data storage device for preventing access of data stored on the device can include a sealed device which defines an inner chamber housing a component communicable with a computer, and digital data being storable on the component; a mechanism communicates with the inner chamber, the mechanism physically disabling the component in the device in response to being activated by a security event; and an element of the mechanism is in spaced relation with the component and positionable to physically contact the component, in response to the activation of the mechanism, incapacitating the component to render digital data stored on the component unretrievable by a computer.

In a related aspect, the mechanism is positioned in the sealed device in a biased state to physically contact the component using the element; and the mechanism is released to an unbiased state to incapacitate the component using the element in response to the activation of the mechanism.

In a related aspect, the apparatus further including a computer communicable with the mechanism to receive an authorized activation instruction of a protocol sent by a user; and in response to the receiving of the authorized activation instruction, the mechanism being activated for physically incapacitating the component in the device.

In another aspect according to the present invention, a system for physically incapacitating data storage functionality of a computer data storage device for preventing access of data stored on the device comprises: a sealed device which defines an inner chamber housing a component communicable with a computer, and digital data being storable on the component; a mechanism communicating with the inner chamber, the mechanism physically disabling the component in the device in response to being activated by a security event; and an element of the mechanism being in spaced relation with the component and positionable to physically contact the component, in response to the activation of the mechanism, incapacitating the component to render digital data stored on the component unretrievable by a computer.

In a related aspect, the system further includes: a computer communicable the mechanism to receive an authorized activation instruction of a protocol sent by a user; and in response to the receiving of the authorized activation instruction, the mechanism being activated for physically incapacitating the component in the device.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. The drawings are discussed forthwith below.

DETAILED DESCRIPTION

The following description with reference to the accompanying drawings is provided to assist in a comprehensive understanding of exemplary embodiments of the invention as defined by the claims and their equivalents. The description includes various specific details to assist in that understanding, but these are to be regarded as merely exemplary, and assist in providing clarity and conciseness. Accordingly, those of ordinary skill in the art will recognize that various changes and modifications of the embodiments described herein can be made without departing from the scope and spirit of the invention. In addition, descriptions of well-known functions and constructions may be omitted.

The terms and words used in the following description and claims are not limited to the bibliographical meanings, but are merely used to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces unless the context clearly dictates otherwise.

EMBODIMENTS AND EXAMPLES

Embodiments and figures of the present disclosure may have the same or similar components as other embodiments. Such figures and descriptions illustrate and explain further examples and embodiments according to the present disclosure. Embodiments of the present disclosure can include operational actions and/or procedures. A method, such as a computer-implemented method, can include a series of operational blocks for implementing an embodiment according to the present disclosure which can include cooperation with one or more systems shown in the figures. The operational blocks of the methods and systems according to the present disclosure can include techniques, mechanism, modules, and the like for implementing the functions of the operations in accordance with the present disclosure. Similar components may have the same reference numerals. Components can operate in concert with a computer implemented method.

It is understood that a user or end user can be a customer and can be an individual, or a group of individuals, or a company or an organization.

Figure 1:
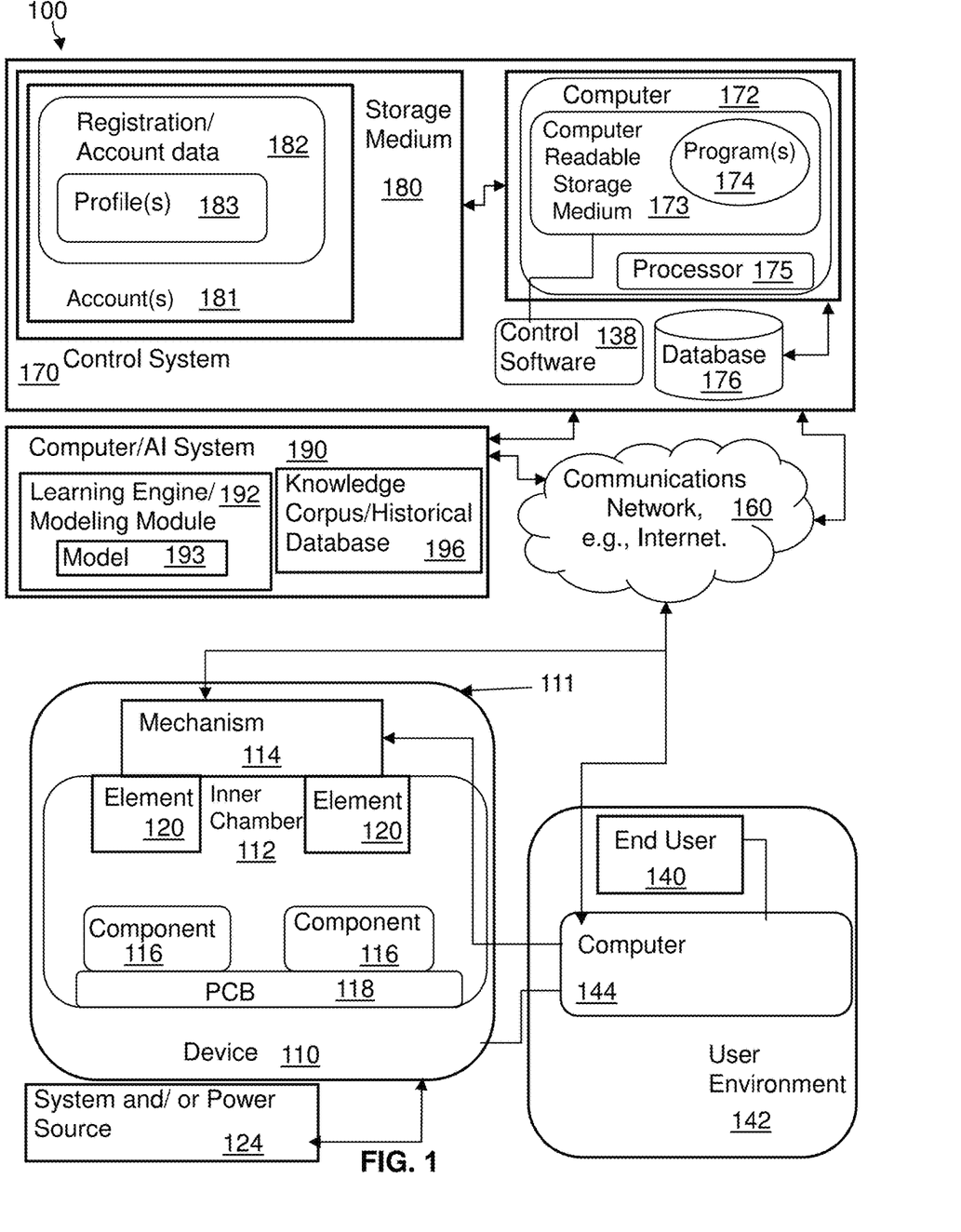
FIG. 1 is a schematic block diagram, according to an embodiment of the present invention, illustrating a system including components and functionality for physically incapacitating an electronic device rendering it functionally inoperable for preventing access electronically to data stored on the device. And in one example, the system can use a computer system to initiate instructions to activate a mechanism for incapacitating the device.

Referring to FIG. 1, a system 100 for physically incapacitating data storage functionality of a computer data storage device for preventing access of data stored on the device, can include a device 110 such as a data storage device, which can include one or more components 116 such as computer readable storage devices. An end user 140 in a user environment 142 can use a computer 144 to communicate electronically with a mechanism 114 and the device 110.

Figure 2:
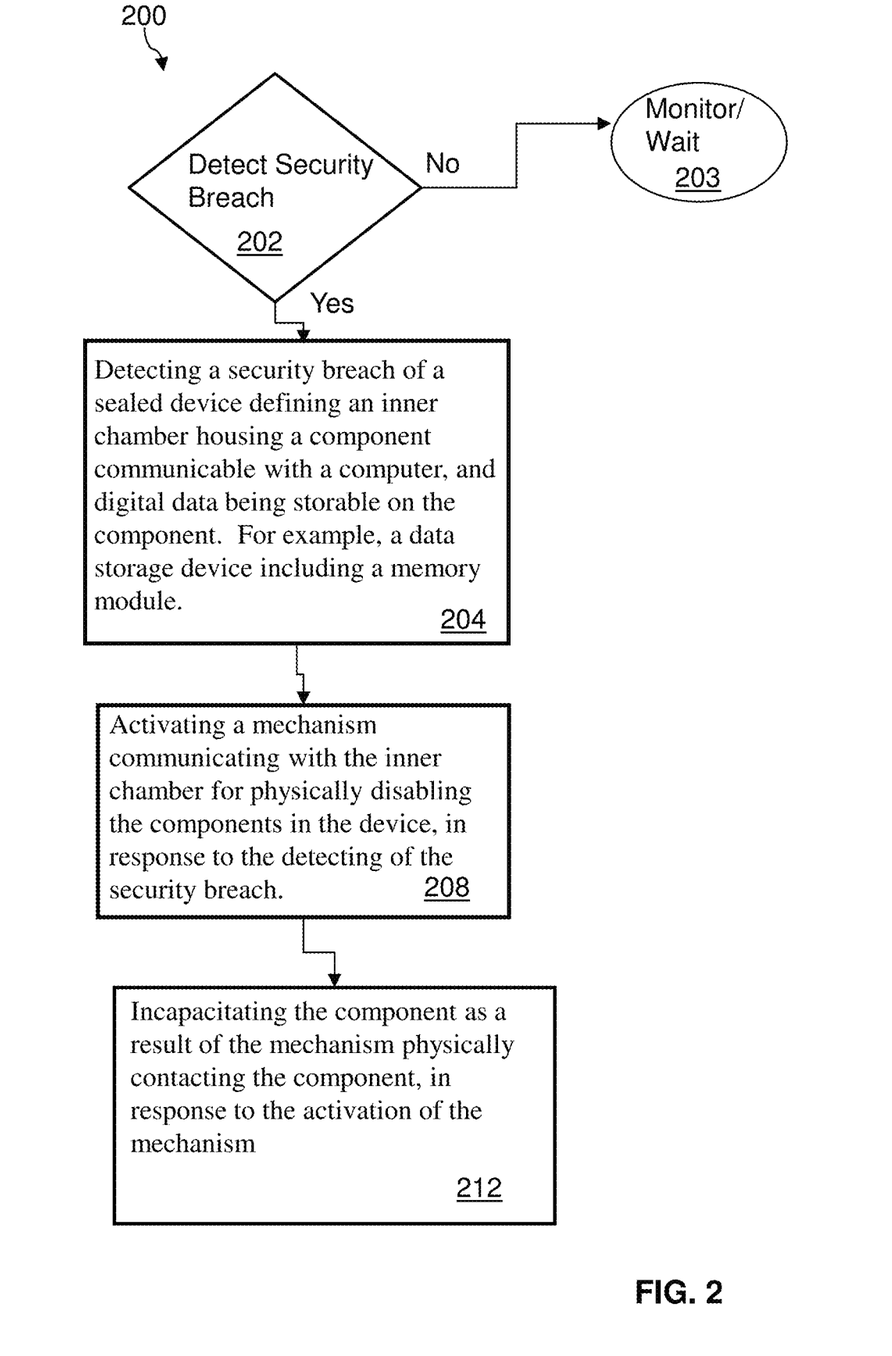
FIG. 2 is a flow chart depicting a method for physically incapacitating an electronic device rendering it functionally inoperable for preventing electronic access to data stored on the device.

A method can be implemented using the system 100. A computer-implemented method 200 can be used to physically incapacitate data storage functionality of a computer data storage device for preventing access of data stored on a device. The method includes detecting a security breach 202 in a device. When the method 200 does not detect a security breach the method continues to monitor or wait to detect a security breach, in block 203, either by a physical event to the device or monitoring the device using a computer which is capable of activating a disabling mechanism for rendering the device inoperable. When the method 200 detects a security breach of the device, the method continues to block 204.

The method 200 includes detecting a security breach of a sealed device 110 housing 111, which defines an inner chamber 112 which houses a component 116 communicable with a computer 144 and/or a system (which can include a computer system) and/or power source 124, as in block 204. Digital data is storable on the component. For example, a sealed device can include a data storage component such as a hard drive, or a flash memory or other type of computer readable memory module.

The method 200 includes activating a mechanism 114 communicating with the inner chamber for physically disabling the components 116 in the device 110, in response to the detecting of the security breach, as in block 208.

The method includes incapacitating the component as a result of the mechanism 114 physically contacting or initiating elements 120 to physically contact the component, in response to the activation of the mechanism, as in block 212. The incapacitating of the component renders digital data stored on the component unretrievable by a computer.

The method can include, for example, the mechanism 114 having elements 120 positioned in the sealed device to physically contact and incapacitate the component in response to the activation of the mechanism.

The method can include, for example, positioning the mechanism 114 in the sealed device 110 in a biased state, such as the elements 120 of the mechanism, to physically contact the component 116. The mechanism including the elements can be released to an unbiased state to incapacitate the components in response to the activation of the mechanism. Thereby, the elements disable corresponding components, in response to the activation, resulting in the destruction of the components rendering the components inoperable and/or destroyed for operation. In another example, the component includes a computer readable data storage medium. Thus, the incapacitation of the component includes data stored on the component being unretrievable by a computer.

The method can further include, for example, receiving an authorized activation instruction, at a computer, of a protocol sent by a user. For example, an authorized user can send an activation instruction thereby qualifying as an activation instruction. The protocol can include, for example, a digital key, password, or an encrypted command. In response to the receiving of the authorized activation instruction, the method can initiate the activating of the mechanism for physically incapacitating the component in the device.

In another example, the incapacitation of the components include physical disablement of computer readable storage medium included as all or in part of the component, wherein data stored on the computer readable storage medium is unreadable by a computer.

In another example, the mechanism can include one or a series of tools and the component can include one or a series of elements. The series of tools are spatially corresponding to the series of elements, respectively. The series of tools physically incapacitate the corresponding series of elements in the sealed device, in response to the activation of the mechanism.

Figure 3:
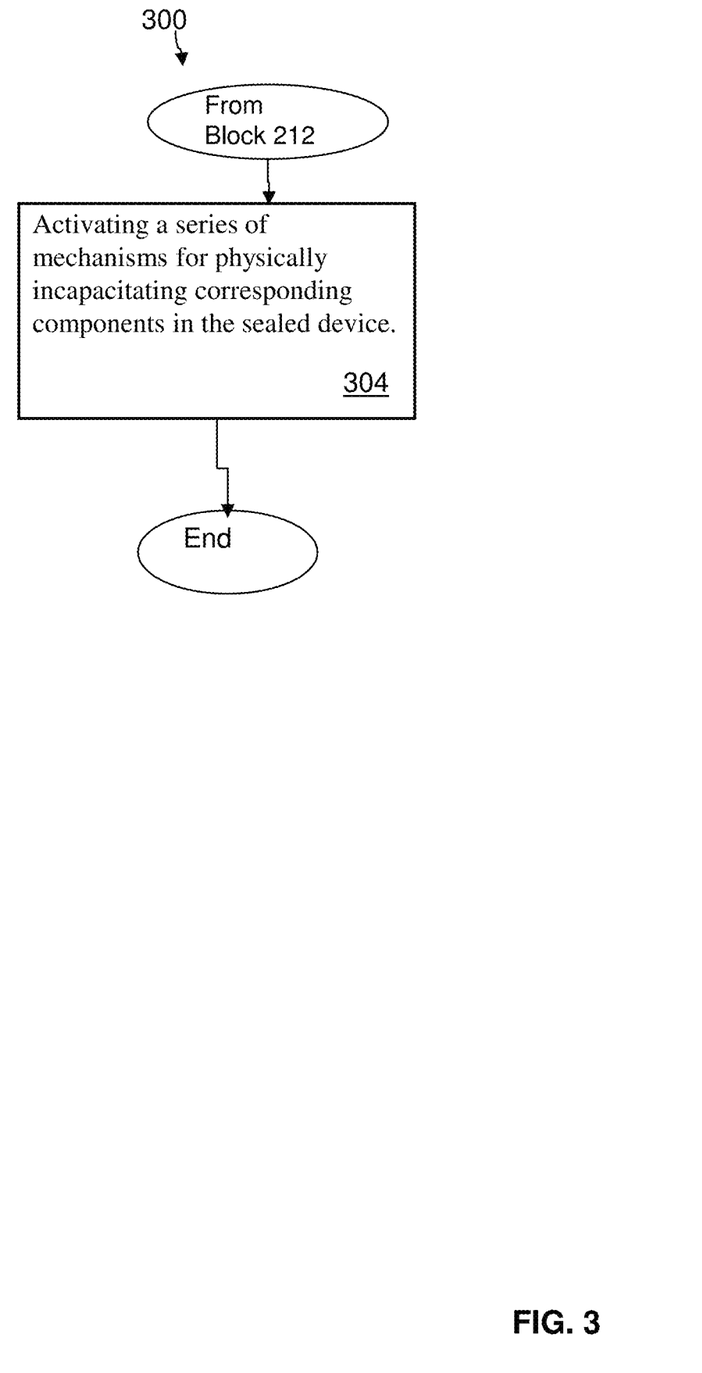
FIG. 3 is another flow chart continuing from the flow chart shown in FIG. 2, according to an embodiment of the present invention.

Referring to FIG. 3, in another embodiment according to the present disclosure, a method 300 continues from block 212 of the method 200 shown in FIG. 2. The method 300 includes activating a series of mechanisms for physically incapacitating corresponding components in the sealed device, as in block 304. The mechanism is part of the series of mechanisms, and the component is part of the corresponding components.

In one example, the components can each include a computer readable data storage medium. In another example, the detecting of the security breach includes detecting a loss of air pressure in the sealed device. In another example, the mechanism can include an element for physically contacting the component.

In another example, the element can include a specified hardened material to disable the component. In another example, the element can be formed in a specified shape to enhance disablement of the component. In another example, the mechanism can include a biased element for disabling the component. In another example, the mechanism can include a coiled spring for disabling the component, the coiled spring can be biased open such that activation of the mechanism releases potential energy of the coiled spring.

In one embodiment according to the present disclosure, an apparatus for physically incapacitating data storage functionality of a computer data storage device for preventing access of data stored on the device can include a sealed device. The sealed device defines an inner chamber housing a component communicable with a computer, and digital data can be stored on the component. A mechanism communicates with the inner chamber, and the mechanism physically disables the component in the device in response to being activated by a security event. The security event can include a security breach of the sealed device, such as, opening a casing and trying to or successfully removing a data storage module or device, such as flash memory. An element of the mechanism is in spaced relation with the component and positionable to physically contact the component, in response to the activation of the mechanism, incapacitating the component to render digital data stored on the component unretrievable by a computer.

In one example, the mechanism is positioned in the sealed device in a biased state to physically contact the component using the element; and the mechanism is released to an unbiased state to incapacitate the component using the element in response to the activation of the mechanism.

In another example, the apparatus can further include a computer communicable the mechanism to receive an authorized activation instruction of a protocol sent by a user; and in response to the receiving of the authorized activation instruction, the mechanism is activated for physically incapacitating the component in the device.

In another embodiment according to the present disclosure, a system for physically incapacitating data storage functionality of a computer data storage device for preventing access of data stored on the device can include a sealed device. The sealed device defines an inner chamber housing a component communicable with a computer, and digital data is storable on the component. A mechanism communicates with the inner chamber, and the mechanism physically disables the component in the device in response to being activated by a security event. An element of the mechanism is in space relation with the component and positionable to physically contact the component, in response to the activation of the mechanism, incapacitating the component to render digital data stored on the component unretrievable by a computer.

In one example, the system can further include a computer communicable the mechanism to receive an authorized activation instruction of a protocol sent by a user; and in response to the receiving of the authorized activation instruction, the mechanism is activated for physically incapacitating the component in the device.

Figure 4:
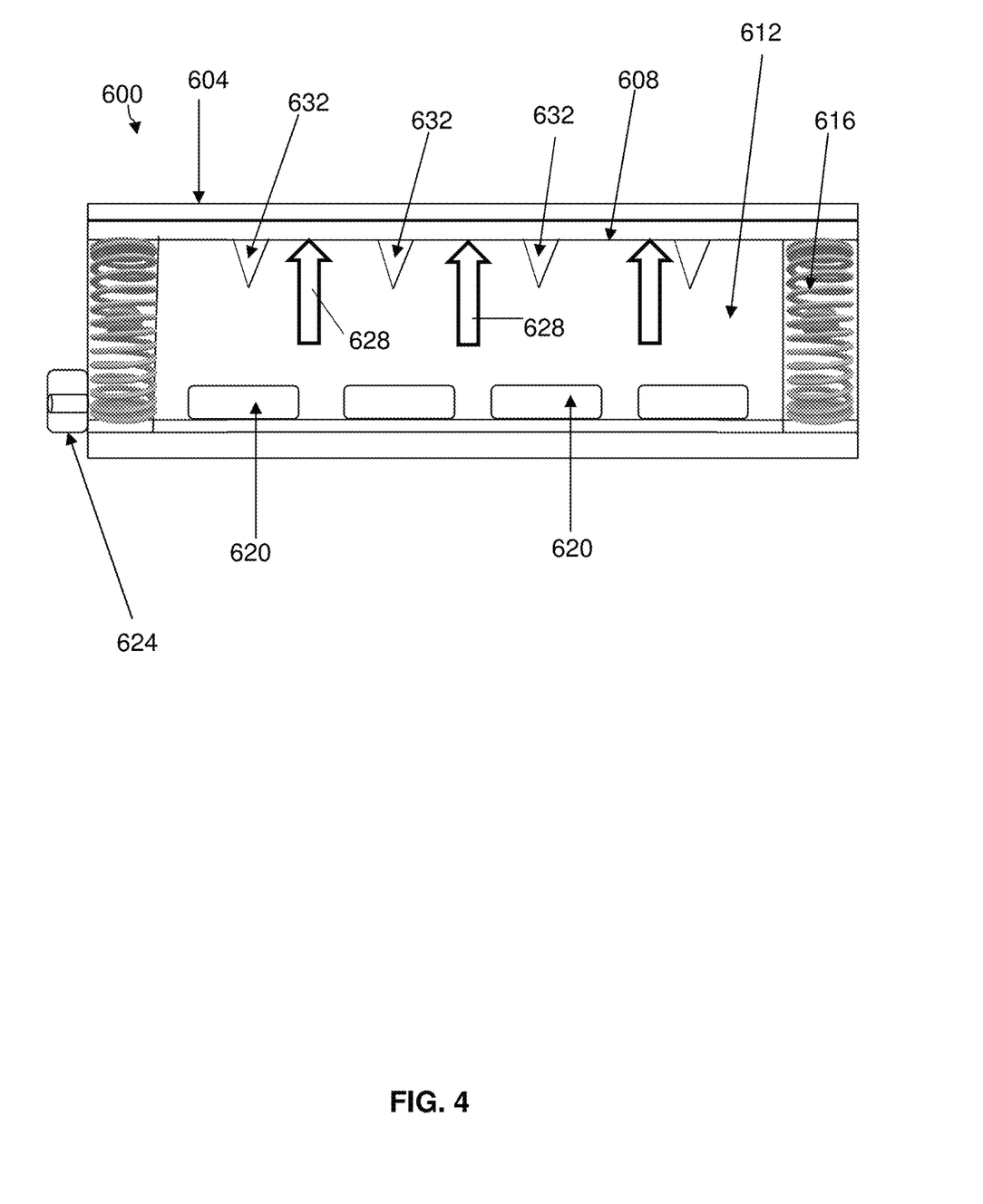
FIG. 4 is an apparatus according to an embodiment of the present invention for physically incapacitating an electronic device using biased springs, rendering it functionally inoperable for preventing electronic access to data stored on the device.

Referring to FIG. 4, according to an embodiment of the present disclosure, an apparatus 600 for physically incapacitating data storage functionality of a computer data storage device for preventing access of data stored on the device. The apparatus 600 includes an outer casing 604 and an inner chamber 608 which is vertically compressible. Springs 616 are positioned at each end of the outer casing and are biased in an extended position. The inner chamber is pressurized as indicated by arrows 628. The springs are held open by the pressurized inner chamber 608. When the pressure is released using the release valve 624, the springs contract and compress the inner chamber such that the smashers 632 with pointed ends physically contact memory modules 620 rendering them inoperable by damaging them. The release valve can be activated by an event, for example, the unsealing of the outer casing, or by manually activation by a person, or by a computer instruction which electronically activates the release valve. In operation, when a security mechanism such as a release valve, has been activated, pressure in a chamber is released via actuating an escape valve, such as the release valve. When the pressure is lowered in the chamber, the tension in the springs is released, and the plate is pulled downward onto the board, where the smashers penetrate and destroy the components.

Figure 5:
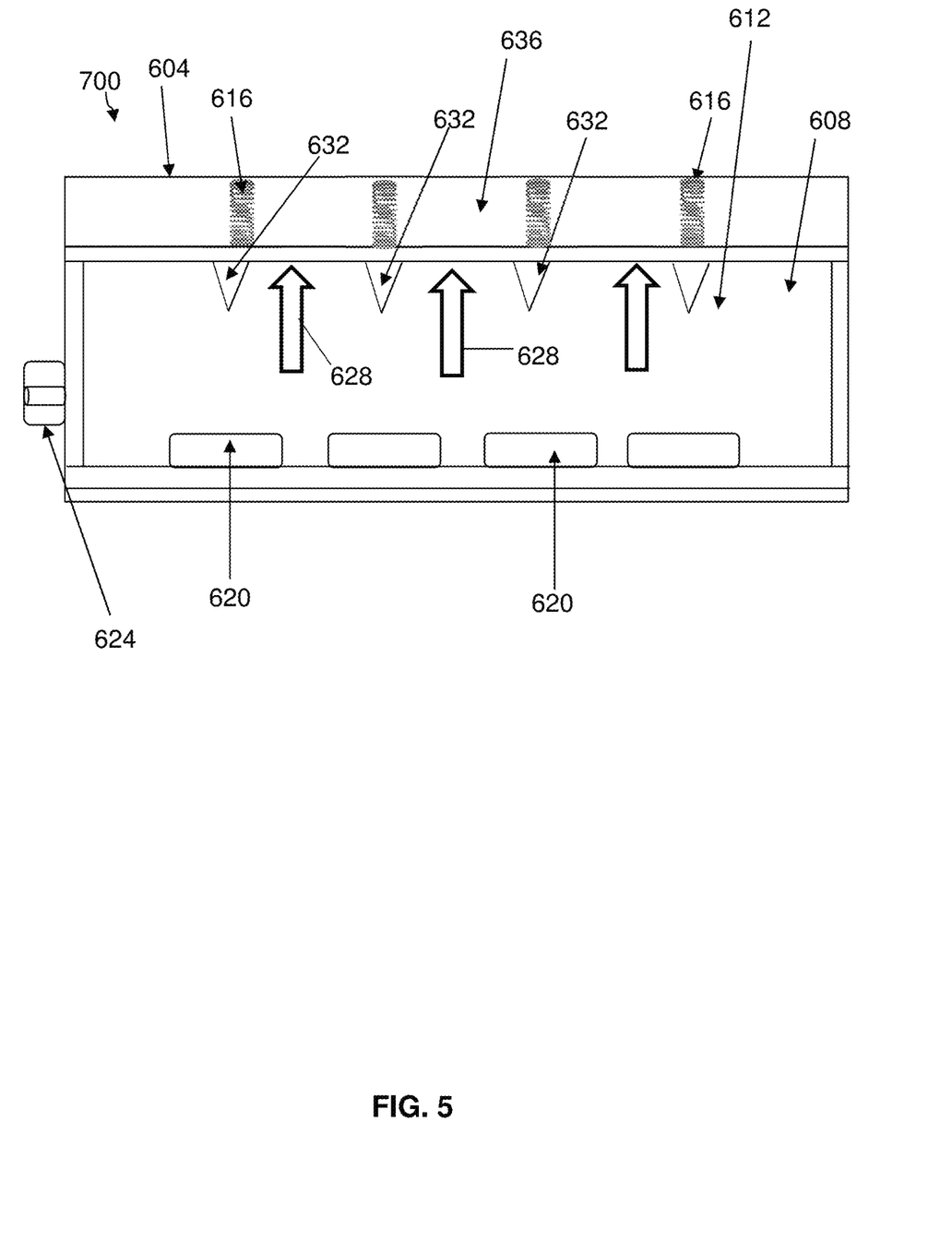
FIG. 5 is another apparatus according to an embodiment of the present invention for physically incapacitating an electronic device using biased springs.

Referring to FIG. 5, according to another embodiment of the present disclosure, an apparatus 700 for physically incapacitating data storage functionality of a computer data storage device for preventing access of data stored on the device. Components of the apparatus 700 can be the same as in the apparatus 600 and are referred to with the same reference numerals. The apparatus 700 can physically incapacitate data storage functionality of a computer data storage device for preventing access of data stored on the device. The apparatus 700 includes an outer casing 604 and an inner chamber 608. Springs 616 are positioned in a spring chamber 636 in line with each of a plurality of smashers 632, and the springs are biased in compression. The inner chamber 608 is pressurized as indicated by arrows 628. The springs are biased in compression by the pressurized inner chamber 608. When the pressure is released using the release valve 624, the springs extend and compress the inner chamber such that the smashers 632 with pointed ends physically contact memory modules 620 rendering them inoperable by damaging them. The release valve can be activated by an event, for example, the unsealing of the outer casing, or by manually activation by a person, or by computer instructions which electronically activates the release valve. In operation, when a security mechanism such as a release valve, has been activated, pressure in a chamber is released via actuating an escape valve, such as the release valve. When the pressure is lowered in the chamber, the tension in the springs is released, and the plate is pushed downward onto the board, where the smashers penetrate and destroy the components. In operation, when the security mechanism has been activated, the pressure in the chamber is released via actuating an escape valve. When the pressure is lowered, the compression in the springs is released and the springs extend downward pushing the board downward so the smashers penetrate and destroy the components rendering the memory modules inoperable.

Figure 6:
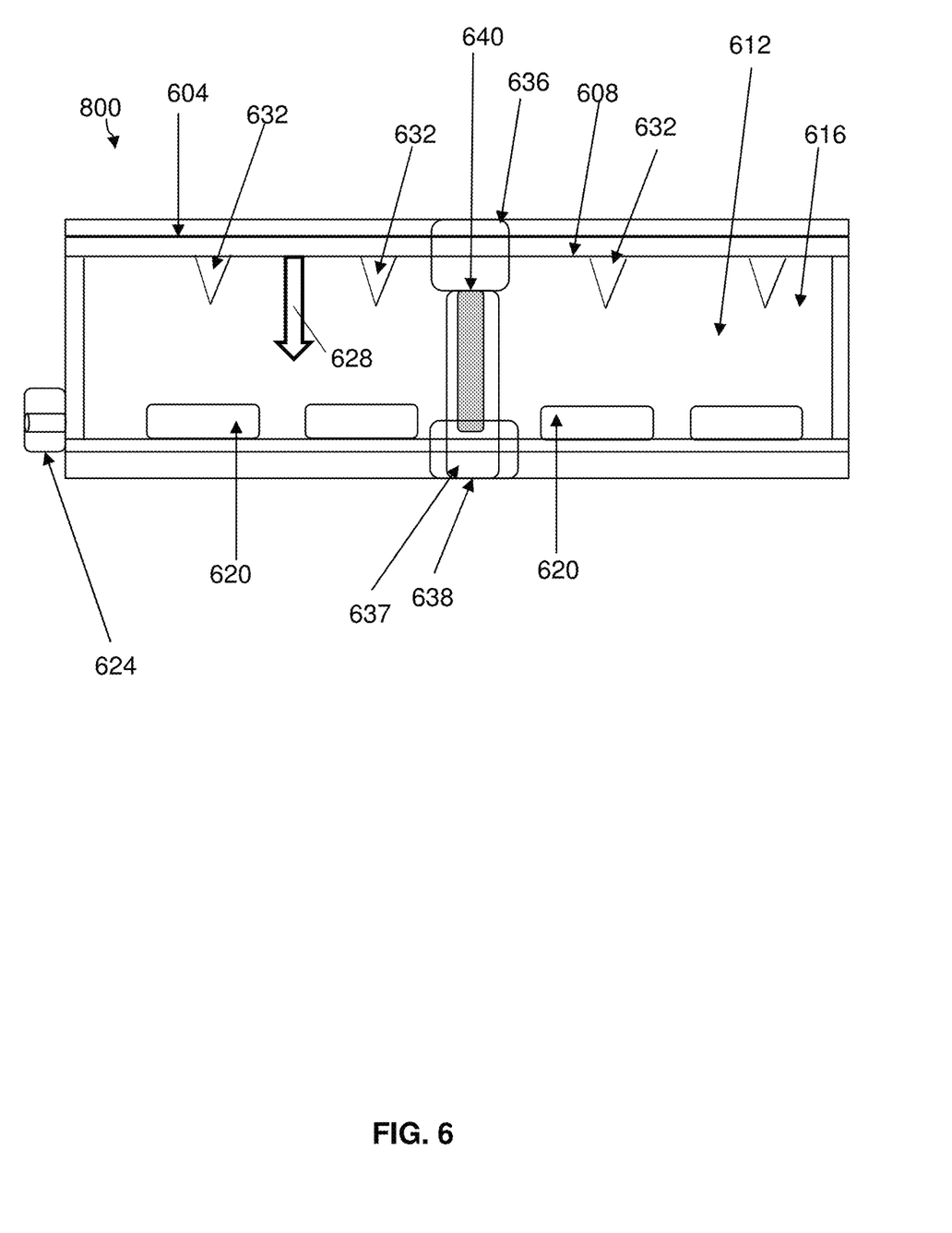
FIG. 6 is another apparatus according to an embodiment of the present invention for physically incapacitating an electronic device using an actuating mechanism.

Referring to FIG. 6, according to another embodiment of the present disclosure, an apparatus 800 for physically incapacitating data storage functionality of a computer data storage device for preventing access of data stored on the device. Components of the apparatus 800 can be the same as shown in the apparatus 600 and the apparatus 700 and are referred to with the same reference numerals. The apparatus 800 can physically incapacitate data storage functionality of a computer data storage device for preventing access of data stored on the device. The apparatus 800 includes an outer casing 604 and an inner chamber 608. A motorized device 636 includes a retractable element 640 retractably housed in a housing 637 which is fastened to the housing at fasten area 638. The inner chamber 608 is pressurized as indicated by arrows 628. The springs are biased in compression by the pressurized inner chamber 608. When the pressure is released using the release valve 624, the springs extend and compress the inner chamber such that the smashers 632 with pointed ends physically contact memory modules 620 rendering them inoperable by damaging them. The release valve can be activated by an event, for example, the unsealing of the outer casing, or by manually activation by a person, or by computer instructions which electronically activates the release valve. In operation, when a security mechanism such as a release valve has been activated, pressure in a chamber is released via actuating an escape valve, or the pressurized inner chamber is breached releasing pressure, the pressure in the chamber is released and a motor 636 can switch on and begins turning the spinning side of a post and screw set represented by housing 637 and element 640. As the barrel nut and screw fasten together, the top plate having the smashers clamps down onto the base containing the memory modules where the smashers penetrate and destroy the components rendering the modules inoperable. The motor continues to turn until the smashers penetrate and destroy the components rendering the modules inoperable.

In general, according to embodiments of the present disclosure, techniques implement destruction of flash memory modules and other integrated circuits within a storage device. In one embodiment, a pressurized chamber to hold a material either under tension or compression (depending on the embodiment) and upon release of the pressure, having a series of "smashers" driven down onto the board, fracturing the components, rendering the device inoperable, and making data recovery impossible. A pressurized chamber can be used as a security mechanism for the storage device to make the device tamper proof. The default state of the mechanism is for elements such as smashing devices to be driven through components, any opening of the drive enclosure, for example, breaching the security of the device enclosure such as breaching a seal of the drive enclosure, results in the pressure in the enclosure being relieved, and the smashers releasing to destroy the components.

In another embodiment, a method can utilizing a motor, and post and screw set as a technique of providing the force to destroy storage device components. When activated, the motor turns the spinning side of the post and screw set, pulling the top plate towards the base. As the two sides clamp together, elements, such as smashers, press into the components, breaking them and rendering them inoperable. External access can be made available to the spinning side of the post and screw set so that the destructive device can be operated manually using common tools, such as a screwdriver or allen wrench. In another example, the destructive device can be operated manually by activating using a computer instruction to initiate electronic activation of the destructive device.

Embodiments and examples according to the present disclosure include destruction of data storage media, using a mechanism which utilizes a pressurized chamber to hold a material either under tension or compression (depending on the embodiment), and upon release of the pressure, having a series of smashers driven down onto the board, breaking the components. In one example, techniques are disclosed for physically destroying flash memory modules and other IC (Integrated Circuit) components in a storage device. In another example according to the present disclosure, includes a self-contained apparatus that contains a destruction mechanism and storage device all-in-one. The storage device can be used directly in a system. Upon unauthorized removal of memory modules, a destruction mechanism is activated, physically destroying the memory modules, such as flash memory, and other components of the storage device. Thus, the present disclosure includes specific methods to actually destroy the media or the device. A mechanism can utilizes a pressurized chamber to hold a material either under tension or compression (depending on the embodiment) and upon release of the pressure, have a series of smashers driven down onto the board, breaking the components.

ADDITIONAL EXAMPLES AND EMBODIMENTS

Referring to the figures, and for example, FIG. 1, a system 100 includes a computer 144 which can be integral to or communicating with a device, and communicate with other computers such as a computer 190 and/or a computer 172. The computer 190 is remote from the computer 144 and can electronically communicate, in all or in part, with a control system computer 172 as part of a control system 170. The control system can include the computer 172 having a computer readable storage medium 173 which can store one or more programs 174, and a processor 175 for executing program instructions, and can also include control software 138 for managing the one or more programs. The control system can also include a storage medium which can include registration and/or account data 182 and profiles 183 of users or entities (such entities can include robotic entities) as part of user accounts 181. User accounts 181 can be stored on a storage medium 180 which is part of the control system 170. The user accounts 181 can include registrations and account data 182 and user profiles 183. The control system can also include the computer 172 having a computer readable storage medium 173 which can store programs or code embedded on the storage medium. The program code can be executed by a processor 175. The computer 172 can communicate with a database 176. The control system 170 can also include a database 176 for storing all or part of such data as described above, and other data.

The control system can also communicate with a computer system 190 which can include a learning engine/module 192 and a knowledge corpus or database 196. The computer system 190 can also communicate with the computer 144 and can be remote from the user computer 144. In another example, the computer system 190 can be all or part of the control system, or all or part of a device. The depiction of the computer system 190 as well as the other components of the system 100 are shown as one example according to the present disclosure. One or more computer systems can communicate with a communications network 160, e.g., the Internet. For example, the computer 190, and the control system 170 can communicate with the communications network 160, and the device/computer 144 can communicate with a local communications network which can communicate with the communications network 160.

In one example, a new or different AI (Artificial Intelligence) ecosystem, or technology/communication or IT (Information Technology) ecosystem can include a local communications network which can communicate with the communications network 160. The system 100 can include a learning engine/module 192, which can be at least part of the control system or communicating with the control system, for generating a model 193 or learning model. In one example, the learning model can model workflow in a new AI or IoT (Internet of Things) ecosystem for machine/devices in the new ecosystem, which, for example, can include the device and mechanism and the initiation of the mechanism in response to a detected security breach to render the components inoperable.

In another example, the computer 172 can include a processor 175 and a computer readable storage medium 173 where an application or program 174 can be stored which can in one example, embody all or part of the method of the present disclosure. The application can include all or part of instructions to implement the method of the present disclosure, embodied in code and stored on a computer readable storage medium.

In other embodiments and examples, in the present disclosure shown in the figures, a computer can be part of a remote computer or a remote server, for example, a remote server. In another example, the computer can be part of a control system and provide execution of the functions of the present disclosure. In another embodiment, a computer can be part of a mobile device and provide execution of the functions of the present disclosure. In still another embodiment, parts of the execution of functions of the present disclosure can be shared between the control system computer and the mobile device computer, for example, the control system function as a back end of a program or programs embodying the present disclosure and the mobile device computer functioning as a front end of the program or programs. A device(s), for example a mobile device or mobile phone, can belong to one or more users, and can be in communication with the control system via the communications network.

The computer can be part of the mobile device, or a remote computer communicating with the mobile device. In another example, a mobile device and a remote computer can work in combination to implement the method of the present disclosure using stored program code or instructions to execute the features of the method(s) described herein. In one example, the device can include a computer having a processor and a storage medium which stores an application, and the computer includes a display. The application can incorporate program instructions for executing the features of the present disclosure using the processor. In another example, the mobile device application or computer software can have program instructions executable for a front end of a software application incorporating the features of the method of the present disclosure in program instructions, while a back end program or programs, of the software application, stored on the computer of the control system communicates with the mobile device computer and executes other features of the method. The control system and the device (e.g., mobile device or computer) can communicate using a communications network, for example, the Internet.

Thus, in one example, a control system can be in communication with a computer or device, and the computer can include an application or software. The computer, or a computer in a mobile device can communicate with the control system using the communications network. In another example, the control system can have a front-end computer belonging to one or more users, and a back-end computer embodied as the control system.

Methods and systems according to embodiments of the present disclosure, can be incorporated, in all or in part, in one or more computer programs or an application stored on an electronic storage medium, and executable by the processor, as part of the computer on mobile device. For example, a mobile device can communicate with the control system, and in another example, a device such as a video feed device can communicate directly with the control system. Other users (not shown) may have similar mobile devices which communicate with the control system similarly. The application can be stored, all or in part, on a computer or a computer in a mobile device and at a control system communicating with the mobile device, for example, using the communications network, such as the Internet. It is envisioned that the application can access all or part of program instructions to implement the method of the present disclosure. The program or application can communicate with a remote computer system via a communications network (e.g., the Internet) and access data, and cooperate with program(s) stored on the remote computer system. Such interactions and mechanisms are described in further detail herein and referred to regarding components of a computer system, such as computer readable storage media, which are shown in one or more embodiments herein and described in more detail in regards thereto referring to one or more computers and systems described herein.

Also, referring to the figures, a device can include a computer, computer readable storage medium, and operating systems, and/or programs, and/or a software application, which can include program instructions executable using a processor. Embodiments of these features are shown herein in the figures. The method according to the present disclosure, can include a computer for implementing the features of the method, according to the present disclosure, as part of a control system. In another example, a computer as part of a control system can work in corporation with a mobile device computer in concert with communication system for implementing the features of the method according to the present disclosure. In another example, a computer for implementing the features of the method can be part of a mobile device and thus implement the method locally.

A control system can include a storage medium for maintaining a registration of users and their devices for analysis of the audio input. Such registration can include user profiles, which can include user data supplied by the users in reference to registering and setting-up an account. In an embodiment, the method and system which incorporates the present disclosure includes the control system (generally referred to as the back-end) in combination and cooperation with a front end of the method and system, which can be the application. In one example, the application is stored on a device, for example, a computer or device on location, and can access data and additional programs at a back end of the application, e.g., control system.

The control system can also be part of a software application implementation, and/or represent a software application having a front-end user part and a back-end part providing functionality. In an embodiment, the method and system which incorporates the present disclosure includes the control system (which can be generally referred to as the back-end of the software application which incorporates a part of the method and system of an embodiment of the present application) in combination and cooperation with a front end of the software application incorporating another part of the method and system of the present application at the device, which may be shown, for example, in the example figures, for instance an application stored on a computer readable storage medium of a computer or device. The application is stored on the device or computer and can access data and additional programs at the back end of the application, for example, in the program(s) stored in the control system.

The program(s) can include, all or in part, a series of executable steps for implementing the method of the present disclosure. A program, incorporating, in all or in part, the present method, can be all or in part stored in the computer readable storage medium on the control system or, in all or in part, on a computer or device. It is envisioned that the control system can not only store the profile of users, but in one embodiment, can interact with a website for viewing on a display of a device such as a mobile device, or in another example the Internet, and receive user input related to the method and system of the present disclosure. It is understood that embodiments shown in the figures depicts one or more profiles, however, the method can include multiple profiles, users, registrations, etc. It is envisioned that a plurality of users or a group of users can register and provide profiles using the control system for use according to the method and system of the present disclosure.

In one example, received data can include data in a knowledge corpus and historical database, which can be populated by historical data gathered, for example, from sensors, robotic device, or other machines or devices.

Referring to one or more embodiments in the figures, a computer or a device, also can be referred to as a user device or an administrator's device, includes a computer having a processor and a storage medium where an application can be stored. The application can embody the features of the method of the present disclosure as instructions. The user can connect to a learning engine using the device. The device which includes the computer and a display or monitor. The application can embody the method of the present disclosure and can be stored on the computer readable storage medium. The device can further include the processor for executing the application/software. The device can communicate with a communications network, e.g., the Internet.

It is understood that the user device is representative of similar devices which can be for other users, as representative of such devices, which can include, mobile devices, smart devices, laptop computers etc.

Additionally, methods and systems according to embodiments of the present disclosure can be discussed in relation to a functional system(s) depicted by functional block diagrams. The methods and systems can include components and operations for embodiments according to the present disclosure, and is used herein for reference when describing the operational steps of the methods and systems of the present disclosure. Additionally, the functional system, according to an embodiment of the present disclosure, depicts functional operations indicative of the embodiments discussed herein.

MORE EXAMPLES AND EMBODIMENTS

The methods and systems of the present disclosure can include a series of operational blocks for implementing one or more embodiments according to the present disclosure. A method shown in the figures may be another example embodiment, which can include aspects/operations shown in another figure and discussed previously, but can be reintroduced in another example. Thus, operational blocks and system components shown in one or more of the figures may be similar to operational blocks and system components in other figures. The diversity of operational blocks and system components depict example embodiments and aspects according to the present disclosure. For example, methods shown are intended as example embodiments which can include aspects/operations shown and discussed previously in the present disclosure, and in one example, continuing from a previous method shown in another flow chart.

It is understood that the features shown in some of the figures, for example block diagrams, are functional representations of features of the present disclosure. Such features are shown in embodiments of the systems and methods of the present disclosure for illustrative purposes to clarify the functionality of features of the present disclosure.

FURTHER DISCUSSION REGARDING EXAMPLES AND EMBODIMENTS

A computer implemented method as disclosed herein can include modeling, using the computer. The model can be generated using a learning engine or modeling module of a computer system which can be all or in part of an Artificial Intelligence (AI) system which communicates with the computer and/or a control system. Such a computer system can include or communicate with a knowledge corpus or historical database. In one example, an acceptable model can include a model meeting specified parameters. In another example, an acceptable model can be a model which has undergone several iterations of modeling. When the model is not acceptable, the method can return to return to a previous operation or proceed as directed, for example as represented by a operational block in a flowchart.

In one example according to the present disclosure, a method can generate a model, using a computer, which can include a series of operations. The model can be generated using a learning engine or modeling module of a computer system which can be all or in part of an Artificial Intelligence (AI) system which communicates with a computer and/or a control system. Such a computer system can include or communicate with a knowledge corpus or historical database.

The model can be generated using a learning engine or modeling module of a computer system which can be all or in part of an Artificial Intelligence (AI) system which communicates with a computer and/or a control system. Such a computer system can include or communicate with a knowledge corpus or historical database. A model can also be generated by an AI system such as an output at least in part of an AI system analysis using machine learning.

ADDITIONAL EMBODIMENTS AND EXAMPLES

Account data, for instance, including profile data related to a user, and any data, personal or otherwise, can be collected and stored, for example, in a control system. It is understood that such data collection is done with the knowledge and consent of a user, and stored to preserve privacy, which is discussed in more detail below. Such data can include personal data, and data regarding personal items.

In one example a user can register have an account with a user profile on a control system. For example, data can be collected using techniques as discussed above, for example, using cameras, and data can be uploaded to a user profile by the user. A user can include, for example, a corporate entity, or department of a business, or a homeowner, or any end user, a human operator, or a robotic device, or other personnel of a business.

Regarding collection of data with respect to the present disclosure, such uploading or generation of profiles is voluntary by the one or more users, and thus initiated by and with the approval of a user. Thereby, a user can opt-in to establishing an account having a profile according to the present disclosure. Similarly, data received by the system or inputted or received as an input is voluntary by one or more users, and thus initiated by and with the approval of the user. Thereby, a user can opt-in to input data according to the present disclosure. Such user approval also includes a user's option to cancel such profile or account, and/or input of data, and thus opt-out, at the user's discretion, of capturing communications and data. Further, any data stored or collected is understood to be intended to be securely stored and unavailable without authorization by the user, and not available to the public and/or unauthorized users. Such stored data is understood to be deleted at the request of the user and deleted in a secure manner. Also, any use of such stored data is understood to be, according to the present disclosure, only with the user's authorization and consent.

In one or more embodiments of the present invention, a user(s) can opt-in or register with a control system, voluntarily providing data and/or information in the process, with the user's consent and authorization, where the data is stored and used in the one or more methods of the present disclosure. Also, a user(s) can register one or more user electronic devices for use with the one or more methods and systems according to the present disclosure. As part of a registration, a user can also identify and authorize access to one or more activities or other systems (e.g., audio and/or video systems). Such opt-in of registration and authorizing collection and/or storage of data is voluntary and a user may request deletion of data (including a profile and/or profile data), un-registering, and/or opt-out of any registration. It is understood that such opting-out includes disposal of all data in a secure manner. A user interface can also allow a user or an individual to remove all their historical data.

The descriptions of the various embodiments of the present invention have been presented for purposes of illustration, but are not intended to be exhaustive or limited to the embodiments disclosed. Likewise, examples of features or functionality of the embodiments of the disclosure described herein, whether used in the description of a particular embodiment, or listed as examples, are not intended to limit the embodiments of the disclosure described herein, or limit the disclosure to the examples described herein. Such examples are intended to be examples or exemplary, and non-exhaustive. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

MORE ADDITIONAL EXAMPLES AND EMBODIMENTS

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 7:
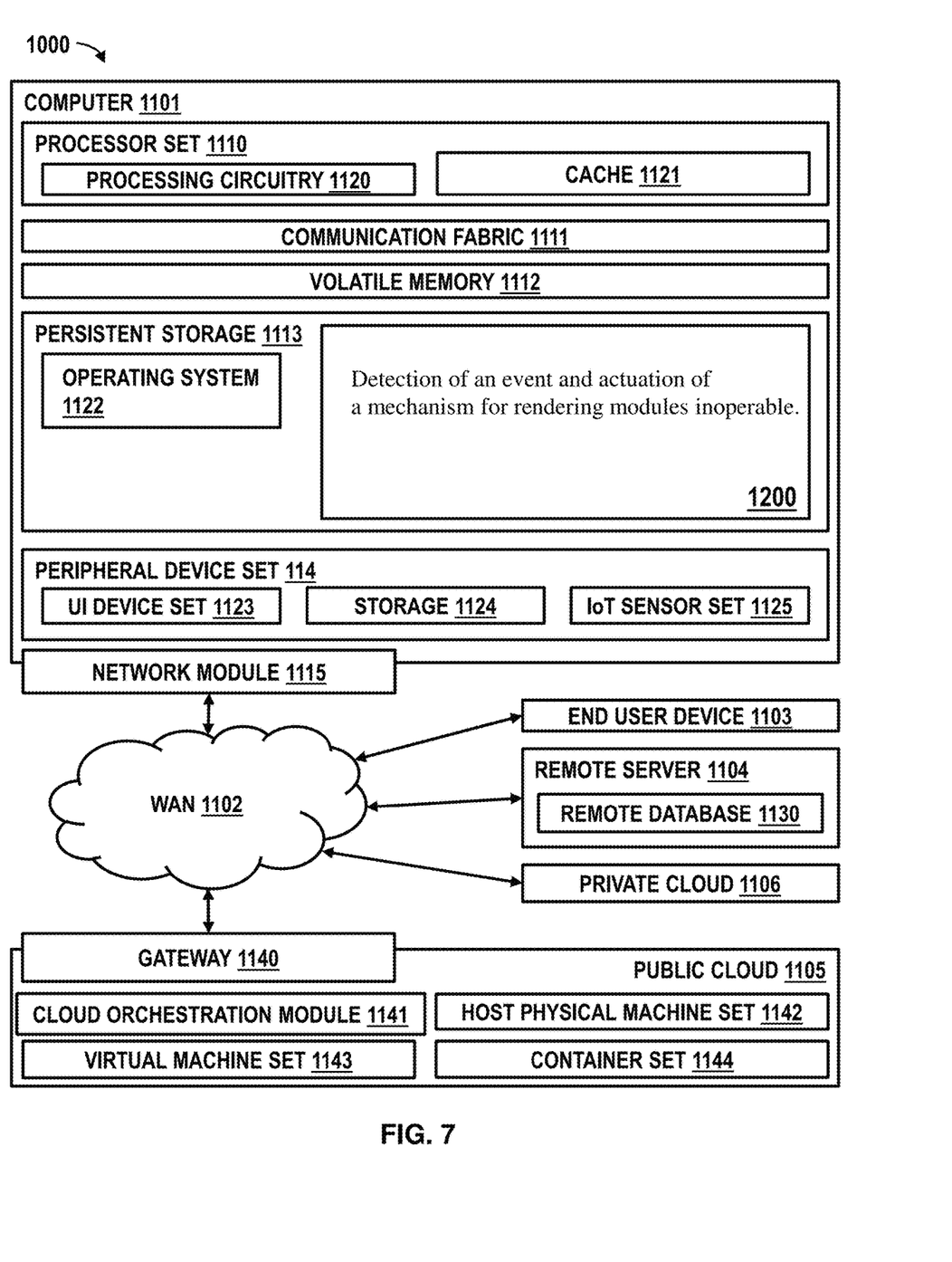
FIG. 7 is a schematic block diagram depicting a computing environment including a computer network and cloud environment, according to an embodiment of the disclosure which may be incorporated and/or cooperate, in all or in part, with one or more computers or devices shown in other figures, and can cooperate with systems and methods shown in the figures.

Referring to FIG. 7, a computing environment 1000 contains an example of an environment for the execution of at least some of the computer code involved in performing the inventive methods, such as detection of an event, such as a breach of the pressurized housing, and actuation of a device or mechanism for rendering modules inoperable, such as damaging memory modules to render them inoperable 1200. In addition to block 1200, computing environment 1000 includes, for example, computer 1101, wide area network (WAN) 1102, end user device (EUD) 1103, remote server 1104, public cloud 1105, and private cloud 1106. In this embodiment, computer 1101 includes processor set 1110 (including processing circuitry 1120 and cache 1121), communication fabric 1111, volatile memory 1112, persistent storage 1113 (including operating system 1122 and block 1200, as identified above), peripheral device set 1114 (including user interface (UI), device set 1123, storage 1124, and Internet of Things (IoT) sensor set 1125), and network module 1115. Remote server 1104 includes remote database 1130. Public cloud 1105 includes gateway 1140, cloud orchestration module 1141, host physical machine set 1142, virtual machine set 1143, and container set 1144.

COMPUTER 1101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1130. As is well understood in the art of computer technology, and depending upon the technology, performance of a computer-implemented method may be distributed among multiple computers and/or between multiple locations. On the other hand, in this presentation of computing environment 1100, detailed discussion is focused on a single computer, specifically computer 1101, to keep the presentation as simple as possible. Computer 1101 may be located in a cloud, even though it is not shown in a cloud in FIG. 7. On the other hand, computer 1101 is not required to be in a cloud except to any extent as may be affirmatively indicated.

PROCESSOR SET 1110 includes one, or more, computer processors of any type now known or to be developed in the future. Processing circuitry 1120 may be distributed over multiple packages, for example, multiple, coordinated integrated circuit chips. Processing circuitry 1120 may implement multiple processor threads and/or multiple processor cores. Cache 1121 is memory that is located in the processor chip package(s) and is typically used for data or code that should be available for rapid access by the threads or cores running on processor set 1110. Cache memories are typically organized into multiple levels depending upon relative proximity to the processing circuitry. Alternatively, some, or all, of the cache for the processor set may be located "off chip." In some computing environments, processor set 1110 may be designed for working with qubits and performing quantum computing.

Computer readable program instructions are typically loaded onto computer 1101 to cause a series of operational steps to be performed by processor set 1110 of computer 1101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1121 and the other storage media discussed below. The program instructions, and associated data, are accessed by processor set 1110 to control and direct performance of the inventive methods. In computing environment 1100, at least some of the instructions for performing the inventive methods may be stored in block 1200 in persistent storage 1113.

COMMUNICATION FABRIC 1111 is the signal conduction paths that allow the various components of computer 1101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 1112 is any type of volatile memory now known or to be developed in the future. Examples include dynamic type random access memory (RAM) or static type RAM. Typically, the volatile memory is characterized by random access, but this is not required unless affirmatively indicated. In computer 1101, the volatile memory 1112 is located in a single package and is internal to computer 1101, but, alternatively or additionally, the volatile memory may be distributed over multiple packages and/or located externally with respect to computer 1101.

PERSISTENT STORAGE 1113 is any form of nonvolatile storage for computers that is now known or to be developed in the future. The non-volatility of this storage means that the stored data is maintained regardless of whether power is being supplied to computer 1101 and/or directly to persistent storage 1113. Persistent storage 1113 may be a read only memory (ROM), but typically at least a portion of the persistent storage allows writing of data, deletion of data and re-writing of data. Some familiar forms of persistent storage include magnetic disks and solid state storage devices. Operating system 1122 may take several forms, such as various known proprietary operating systems or open source Portable Operating System Interface type operating systems that employ a kernel. The code included in block 1200 typically includes at least some of the computer code involved in performing the inventive methods.

PERIPHERAL DEVICE SET 1114 includes the set of peripheral devices of computer 1101. Data communication connections between the peripheral devices and the other components of computer 1101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 1123 may include components such as a display screen, speaker, microphone, wearable devices (such as goggles and smart watches), keyboard, mouse, printer, touchpad, game controllers, and haptic devices. Storage 1124 is external storage, such as an external hard drive, or insertable storage, such as an SD card. Storage 1124 may be persistent and/or volatile. In some embodiments, storage 1124 may take the form of a quantum computing storage device for storing data in the form of qubits. In embodiments where computer 1101 is required to have a large amount of storage (for example, where computer 1101 locally stores and manages a large database) then this storage may be provided by peripheral storage devices designed for storing very large amounts of data, such as a storage area network (SAN) that is shared by multiple, geographically distributed computers. IoT sensor set 1125 is made up of sensors that can be used in Internet of Things applications. For example, one sensor may be a thermometer and another sensor may be a motion detector.

NETWORK MODULE 1115 is the collection of computer software, hardware, and firmware that allows computer 1101 to communicate with other computers through WAN 1102. Network module 1115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1115 are performed on the same physical hardware device. In other embodiments (for example, embodiments that utilize software-defined networking (SDN)), the control functions and the forwarding functions of network module 1115 are performed on physically separate devices, such that the control functions manage several different network hardware devices. Computer readable program instructions for performing the inventive methods can typically be downloaded to computer 1101 from an external computer or external storage device through a network adapter card or network interface included in network module 1115.

WAN 1102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1103 is any computer system that is used and controlled by an end user (for example, a customer of an enterprise that operates computer 1101), and may take any of the forms discussed above in connection with computer 1101. EUD 1103 typically receives helpful and useful data from the operations of computer 1101. For example, in a hypothetical case where computer 1101 is designed to provide a recommendation to an end user, this recommendation would typically be communicated from network module 1115 of computer 1101 through WAN 1102 to EUD 1103. In this way, EUD 1103 can display, or otherwise present, the recommendation to an end user. In some embodiments, EUD 1103 may be a client device, such as thin client, heavy client, mainframe computer, desktop computer and so on.

REMOTE SERVER 1104 is any computer system that serves at least some data and/or functionality to computer 1101. Remote server 1104 may be controlled and used by the same entity that operates computer 1101. Remote server 1104 represents the machine(s) that collect and store helpful and useful data for use by other computers, such as computer 1101. For example, in a hypothetical case where computer 1101 is designed and programmed to provide a recommendation based on historical data, then this historical data may be provided to computer 1101 from remote database 1130 of remote server 1104.

PUBLIC CLOUD 1105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1105 is performed by the computer hardware and/or software of cloud orchestration module 1141. The computing resources provided by public cloud 1105 are typically implemented by virtual computing environments that run on various computers making up the computers of host physical machine set 1142, which is the universe of physical computers in and/or available to public cloud 1105. The virtual computing environments (VCEs) typically take the form of virtual machines from virtual machine set 1143 and/or containers from container set 1144. It is understood that these VCEs may be stored as images and may be transferred among and between the various physical machine hosts, either as images or after instantiation of the VCE. Cloud orchestration module 1141 manages the transfer and storage of images, deploys new instantiations of VCEs and manages active instantiations of VCE deployments. Gateway 1140 is the collection of computer software, hardware, and firmware that allows public cloud 1105 to communicate through WAN 1102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1106 is similar to public cloud 1105, except that the computing resources are only available for use by a single enterprise. While private cloud 1106 is depicted as being in communication with WAN 1102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1105 and private cloud 1106 are both part of a larger hybrid cloud.

It is also understood that the one or more computers or computer systems shown in the figures can include all or part of the computing environment 1000 and its components, and/or in one example, the one or more computers can communicate with all or part of the computing environment 1000 and its components as a remote computer system, to achieve the computer functions described in the present disclosure.

What is claimed is:

1. A computer-implemented method for physically incapacitating data storage functionality of a computer data storage device for preventing access of data stored on the device, comprising:
    detecting a security breach of a sealed device defining an inner chamber housing a component communicable with a computer, and digital data being storable on the component, the detecting of the security breach of the sealed device including monitoring the sealed device using a computer communicating with a mechanism, the computer being capable of activating the mechanism for rendering the sealed device inoperable, and wherein the security breach of the sealed device includes a physical event to the sealed device;
    activating the mechanism which communicates with the inner chamber for physically disabling the component in the sealed device, in response to the detecting of the security breach; and
    incapacitating the component as a result of the mechanism physically contacting the component, in response to the activation of the mechanism, the incapacitating of the component renders digital data stored on the component unretrievable by a computer.

2. The method of claim 1, wherein the mechanism is positioned in the sealed device to physically contact and incapacitate the component in response to the activation of the mechanism.

3. The method of claim 1, wherein the mechanism is positioned in the sealed device in a biased state to physically contact the component; and
    the mechanism is released to an unbiased state to incapacitate the component in response to the activation of the mechanism.

4. The method of claim 1, wherein the component includes a computer readable data storage medium.

5. The method of claim 1, further comprising:
receiving an authorized activation instruction at the computer, of a protocol sent by a user; and
in response to the receiving of the authorized activation instruction, initiating the activating of the mechanism for physically incapacitating the component in the device.

6. The method of claim 1, wherein the incapacitation of the component includes physical disablement of computer readable storage medium included in the component, wherein data stored on the computer readable storage medium is unreadable by a computer.

7. The method of claim 1, wherein the mechanism includes a series of elements and the component includes a series of modules, the series of elements spatially corresponding to the series of elements, respectively, and the series of elements physically incapacitating the corresponding series of modules in the sealed device, in response to the activation of the mechanism.

8. The method of claim 1, further comprising,
activating a series of mechanisms for physically incapacitating corresponding components in the sealed device, wherein the mechanism is part of the series of mechanisms, and the component is part of the corresponding components.

9. The method of claim 1, wherein the components each include a computer readable data storage medium.

10. The method of claim 1, wherein the detecting of the security breach includes detecting a loss of air pressure in the sealed device.

11. The method of claim 1, wherein the mechanism includes an element for physically contacting the component.

12. The method of claim 11, wherein the element is comprised of a specified hardened material to disable the component.

13. The method of claim 11, wherein the element is formed in a specified shape to enhance disablement of the component.

14. The method of claim 1, wherein the mechanism includes a biased element for disabling the component.

15. The method of claim 1, wherein the mechanism includes a coiled spring for enabling disablement of the component, the coiled spring being biased open such that activation of the mechanism releases potential energy of the coiled spring.

16. An apparatus for physically incapacitating data storage functionality of a computer data storage device for preventing access of data stored on the device, which comprises:
a sealed device which defines an inner chamber housing a component communicable with a computer, and digital data being storable on the component;
a mechanism communicating with the inner chamber, the mechanism physically disabling the component in the device in response to being activated by a security event, the mechanism being activatable by a computer communicable with the mechanism for rendering the sealed device inoperable, and the security breach of the sealed device includes a physical event to the sealed device; and
an element of the mechanism being in spaced relation with the component and positionable to physically contact the component, in response to the activation of the mechanism, incapacitating the component to render digital data stored on the component unretrievable by a computer.

17. The apparatus of claim 16, wherein the mechanism is positioned in the sealed device in a biased state to physically contact the component using the element; and
the mechanism is released to an unbiased state to incapacitate the component using the element in response to the activation of the mechanism.

18. The apparatus of claim 16, further comprising:
the computer being communicable with the mechanism to receive an authorized activation instruction of a protocol sent by a user; and
in response to the receiving of the authorized activation instruction, the mechanism being activated for physically incapacitating the component in the device.

19. A system for physically incapacitating data storage functionality of a computer data storage device for preventing access of data stored on the device, which comprises:
a sealed device which defines an inner chamber housing a component communicable with a computer, and digital data being storable on the component;
a mechanism communicating with the inner chamber, the mechanism physically disabling the component in the device in response to being activated by a security event, the mechanism being activatable by a computer communicable with the mechanism for rendering the sealed device inoperable, and the security breach of the sealed device includes a physical event to the sealed device; and
an element of the mechanism being in spaced relation with the component and positionable to physically contact the component, in response to the activation of the mechanism, incapacitating the component to render digital data stored on the component unretrievable by a computer.

20. The system of claim 19, further comprising:
the computer being communicable with the mechanism to receive an authorized activation instruction of a protocol sent by a user; and
in response to the receiving of the authorized activation instruction, the mechanism being activated for physically incapacitating the component in the device.

* * * * *